US00RE34790E

United States Patent [19]

Musk

[11] E Patent Number: Re. 34,790

[45] Reissued Date of Patent: Nov. 15, 1994

[54] OPTICAL COMPONENTS

[75] Inventor: Robert W. Musk, Yokohama, Japan

[73] Assignee: BT&D Technologies Limited, Ispwich, England

[21] Appl. No.: 921,325

[22] PCT Filed: Jul. 12, 1989

[86] PCT No.: PCT/GB89/00792

§ 371 Date: Feb. 23, 1990

§ 102(e) Date: Feb. 23, 1990

[87] PCT Pub. No.: WO90/00753

PCT Pub. Date: Jan. 25, 1990

Related U.S. Patent Documents

Reissue of:

[64] Patent No.: 5,094,518
Issued: Mar. 10, 1992
Appl. No.: 465,112
Filed: Feb. 23, 1990

[30] Foreign Application Priority Data

Jul. 13, 1988 [GB] United Kingdom ..... 8816603

[51] Int. Cl.[5] ..... G02B 6/26; G02B 6/36

[52] U.S. Cl. ..... 385/93; 385/35; 385/53

[58] Field of Search ..... 385/35, 53, 33, 31, 385/39

[56] References Cited

U.S. PATENT DOCUMENTS

| | | | |
|---|---|---|---|
| 4,173,389 | 11/1979 | Curtis | 385/35 |
| 4,639,077 | 1/1987 | Dobler | 385/93 |
| 4,709,979 | 12/1987 | Spodati et al. | 385/92 |
| 4,880,290 | 11/1989 | Kumazawa et al. | 385/95 |

FOREIGN PATENT DOCUMENTS

| | | |
|---|---|---|
| 39309/72 | 8/1973 | Australia . |
| 0135971 | 4/1985 | European Pat. Off. . |
| 2075117 | 10/1971 | France . |
| 2287108 | 4/1976 | France . |
| 1558063 | 12/1979 | United Kingdom . |

OTHER PUBLICATIONS

Patent Abstracts of Japan, vol. 10, No. 198 (P-476)(2254), 11 Jul. 1986, & JP, A, 6141110.

*Primary Examiner*—Akm E. Ullah
*Attorney, Agent, or Firm*—Nixon & Vanderhye

[57] ABSTRACT

A method of making an opto-electronic component (13) comprises inserting a pre-assembled device carrier (1) into a mould, filling the mould (2) with light and/or thermally curable material, optically aligning the device assembly and, on achieving optical alignment, at least partially curing the material.

8 Claims, 3 Drawing Sheets

OPTICAL COMPONENTS

Matter enclosed in heavy brackets [ ] appears in the original patent but forms no part of this reissue specification; matter printed in italics indicates the additions made by reissue.

*This application is a reissue of 07/465,112 filed on Feb. 23, 1990, U.S. Pat. No. 5,094,518.*

This invention relates to optical components for use with optical fibers and other optical waveguides, and to methods of manufacturing such components. In particular, though not exclusively, this invention relates to opto-electronic components for transmitting, receiving or otherwise processing optical signals, and their manufacture.

The dimensions of the active, or light emitting, area of light sources (such as semi-conductor lasers and light emitting diodes) used in optical fiber communications systems are typically of the order of a few μm. In a single mode optical fiber suitable for use in the 1.3 μ, and 1.5 μm wavelength regions the core is about 5–10 μm in diameter. Efficient optical coupling between the fiber and the light source requires that their alignment be accurate to within a few μm (or less), both transversely and axially.

The dimensions of the active areas of photo-detectors are usually larger, of the order of 50–100 μm and the alignment tolerances between the fiber and the detector are generally more relaxed. However, in the case of an optical travelling wave amplifier, for example, the light sensitive receiving area of the device is of the same dimensions as the active area of a laser.

The need for consistently high accuracy of optical alignments forms one of the major problems which needs to be overcome if optical devices are to be manufactured in large volumes. Large volume manufacture is, of course, essential to reducing the cost of optical fiber communications systems.

Permanently attaching a fiber "pigtail" to the device is one of the widely adopted solutions. Here, the critical alignment between the fiber and the device is made during manufacture. To connect the device to an optical fiber transmission line, a relatively easily aligned fiber-to-fiber splice is formed between the pigtail and the transmission fiber. Use of a spliced connection is readily acceptable only in applications where the connection between the optical device and the transmission fiber needs rarely if ever to be broken or re-made.

GB Patent 1558063 ("Improvements in or relating to dielectric optical waveguide couplings", The Post Office) discloses an opto-electronic component in which the opto-electronic device is housed in an optical fiber connector. The opto-electronic device may be located in either the male or the female part of the connector. This arrangement of an optical device mounted in an optical fiber connector is sometimes referred to as a "connectorised device".

Use of a connector-mounted device permits easy and repeated connection and disconnection between the fiber and the device and is potentially fairly cheap to manufacture. Ensuring adequate optical alignment between the fiber and the device does, however, present some difficulties.

The present invention aims to provide a method of manufacturing optical components, which will more reliably yield adequately accurate optical alignment.

The present invention also aims to provide a connector-mounted optical component made by that method.

According to the present invention, a method of making an optical component comprises inserting a pre-assembled device carrier, comprising an optical component mounted on a support structure, into a mould, filling the mould with light and/or thermally curable material, optically aligning the device assembly and, on achieving alignment, at least partially curing the material to form an alignment shell about the device carrier.

Any partial curing of the material must be sufficient to ensure adequate rigidity to avoid relative movement of the parts until full curing has taken place.

Full curing preferably takes place at elevated temperature.

According to another aspect of the present invention, an optical component comprises a pre-assembled device carrier comprising a support structure and an optical component mounted thereon, and further comprises an alignment shell about the device carrier formed of light and/or thermally cured material.

Preferably, the optical component is an opto-electronic component capable of converting light into an electric signal or vice versa.

The present invention will not be described further by way of example only, and with reference to the accompanying drawings, of which:

Figure 1A:
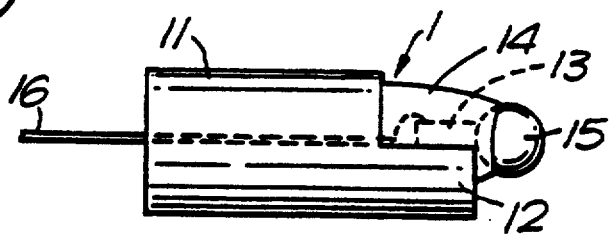
FIGS. 1a to 1f are schematic illustrations of various stages in the manufacture according to the present invention of an opto-electronic component.

Referring now also the drawings, FIG. 1a shows a preassembled carrier 1 for an opto-electronic device 13. The carrier 1 comprises a tubular carrier member 11 of conductive material, having mounted on a flat mounting surface at a stepped end 12 thereof an opto-electronic device 13. Secured by adhesive resin 14 to the opto-electronic device 13 and the stepped end 12 of the carrier member 11, is a spherical collimating or focussing lens 15. Electrical connections to the opto-electronic device 13 are provided by the tubular member 11 itself, and by a terminal 16 of a wire 17 (see FIG. 2) insulated from, and extending the length of, the tubular member 11.

Figure 1B:
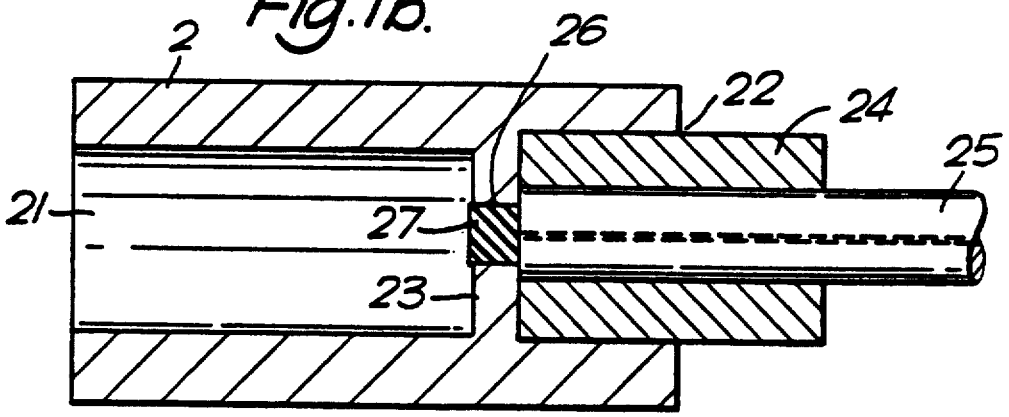
Figure 1C:
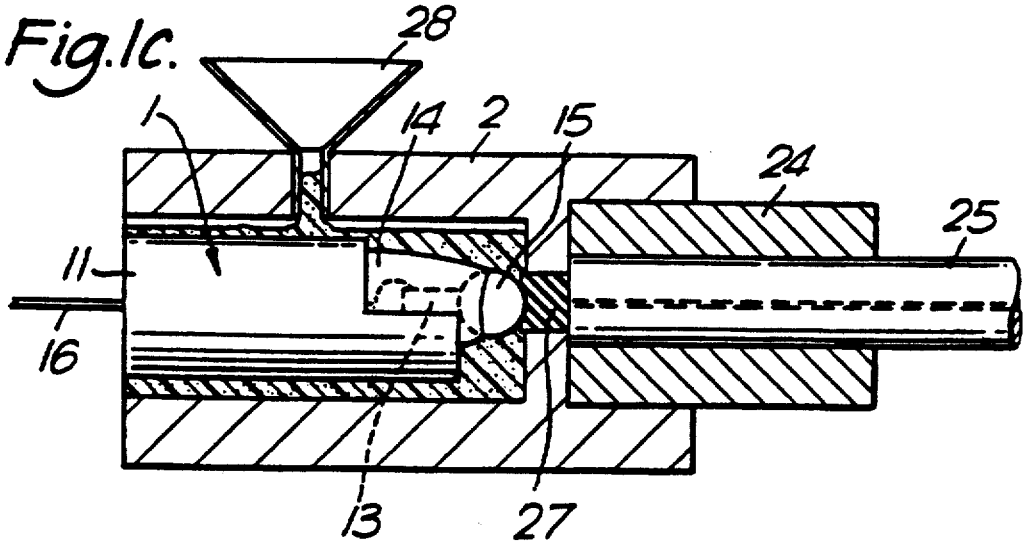
Figure 1D:
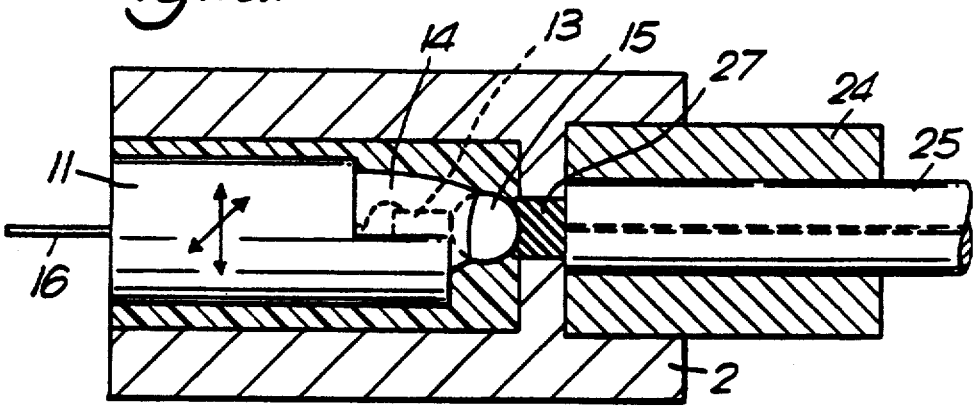

FIG. 1b shows a mould 2 in which to form an alignment shell around the carrier 1 of FIG. 1a. The mould comprises two axially aligned cyclindrical sleeve portions 21 and 22, separated by an intermediate wall 23. The sleeve portions 21 is of an internal diameter larger than the maximum transverse dimension of the carrier 1; the sleeve portion 22 provides a push fit about an optical fiber connector ferrule 24 enclosing an optical fiber 25 and ending flush with the fiber 25. The intermediate wall 23 is has an aperture 26 which locates a plug 27 of silicone rubber or another suitable resilient material which is transparent at the wavelength of operation of the opto-electronic device 13.

As illustrated by FIGS. 1c to 1f, the manufacture of an opto-electronic component proceeds as follows:

The pre-assembled carrier 1 is inserted fully into the sleeve portion 22 of mould 2 until it touches and slightly deforms the plug 27. Thereupon the mould is filled with a liquid, UV and thermo-curable material as schematically indicated by the funnel 28. To be suitable the material must have good environmental stability when cured. Methacrylate resin providing a matrix for finely ground boro-silcate glass has been found to be satisfactory in this respect.

Once the mould is filled, the carrier 1 is moved transversely until optimum alignment between the device 13 and the core 29 of the optical fiber 25 has been achieved as measured by the amount of light coupled into or out of the fiber 25. It should be noted that the resilient plug 27 will provide a barrier to the liquid mould feed thereby to avoid contamination of the front portion of the surface of the lens 15.

Figure 1E:
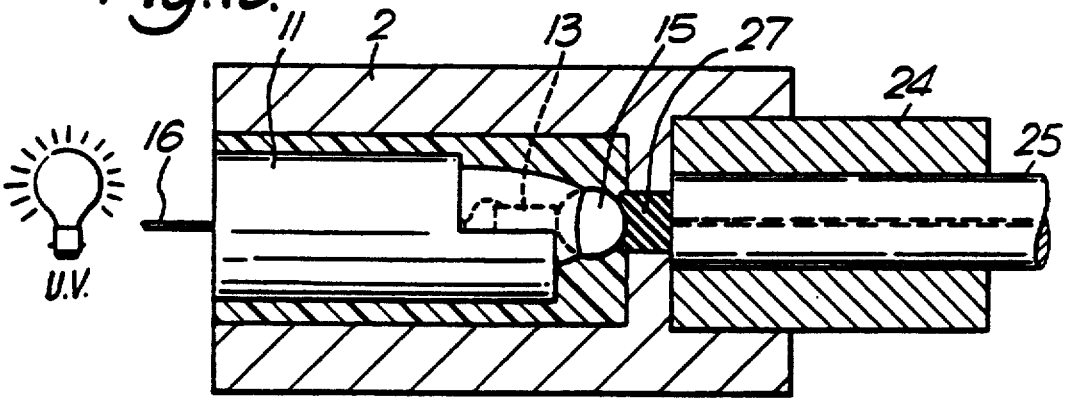

On reaching optimum alignment, the mould feed is at least partly cured by irradiation with light from a UV source 30, as schematically shown in FIG. 1e. This UV curing process must result in adequate dimensional stability to allow removal of the completed component 4 from the mould 2 without adversely affecting the positioning of the carrier 1 within the moulded shell 31. Instead of irradiating the resin from the end of the mould, a transparent mould irradiated from all directions could be used, for example.

Figure 1F:
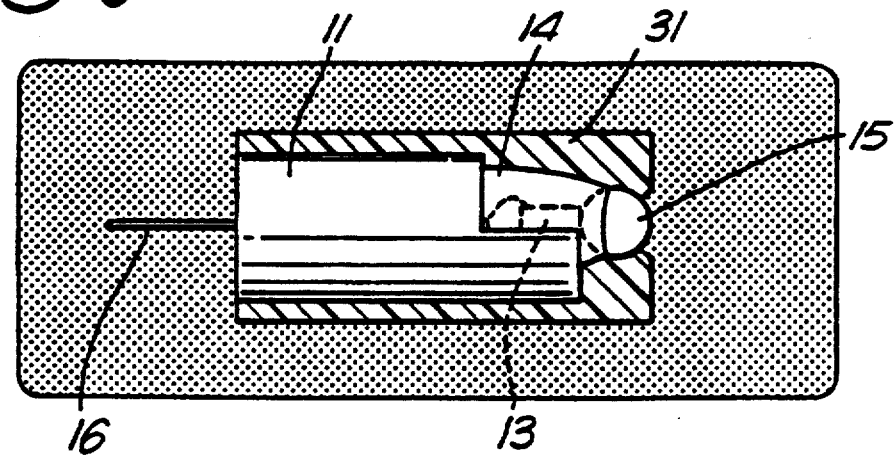

If required by the material properties, the curing process can be completed at elevated temperatures as indicated by FIG. 1f. Suitable elevated curing temperatures are typically 80° C. to 150° C.

Figure 2:
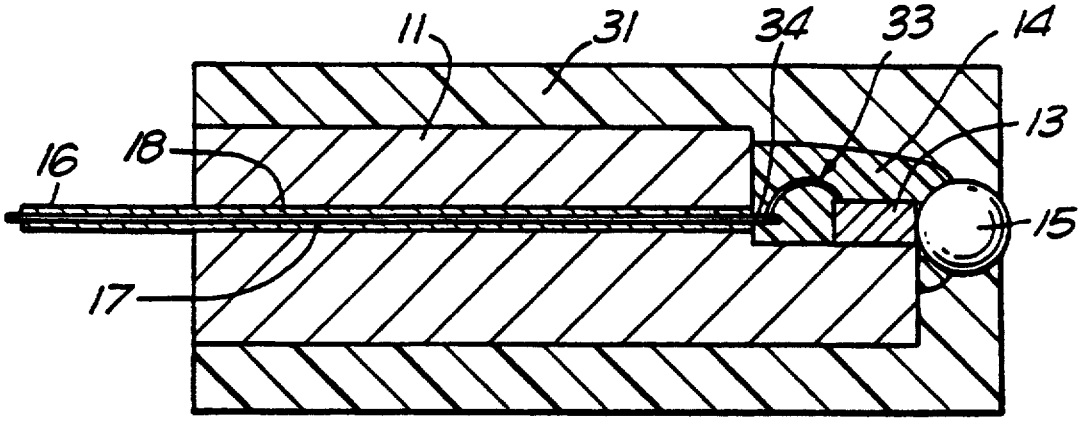
FIG. 2 is a schematic sectional view of an opto-electronic component made according to the method illustrated in FIG. 1.

FIG. 2 shows a schematic length-wise section through a completed opto-electronic component. In addition to the features of the carrier already described with reference to FIG. 1a, there is shown the central conductor 17 leading, within an insulating sleeve 18, from the terminal 16 to a bonding pad 34. A bond wire 33 is attached to the bonding pad 34 at on end, and to a top contact of the device 13 at its other end.

The shell 31 provides a highly concentric alignment surface around the component which thus can provide a male portion of an optical fiber connector, for example.

Figure 3:
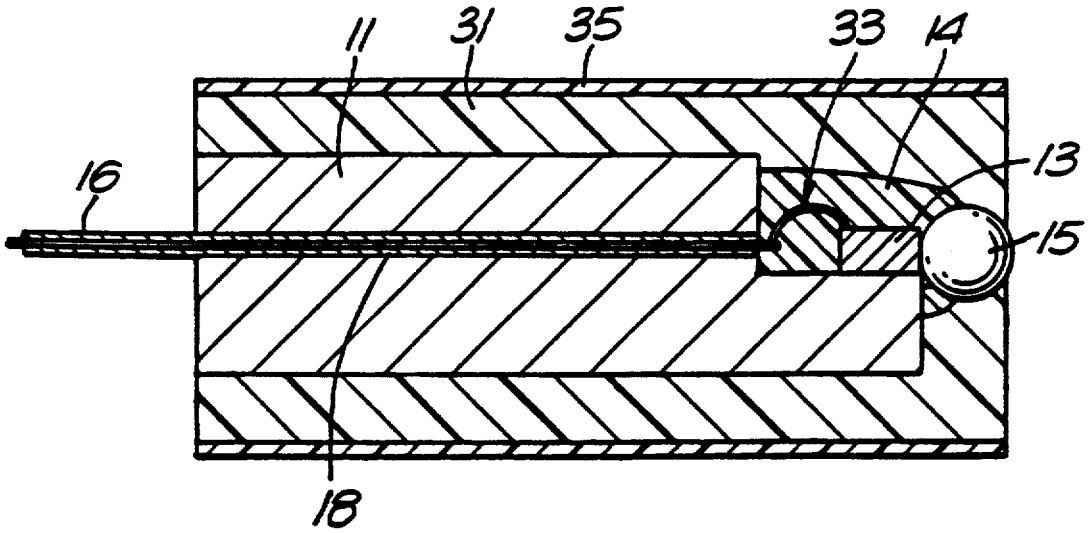
FIG. 3 is a schematic sectional view of a modified opto-electronic component.

FIG. 3 shows a schematic length-wise sectin through a modified form of the component of FIG. 2. Using a resin matrix for ground boro-silicate glass provides an external surface to the shell which is of excellent thermal and mechanical stability; however, the glass particles in the material or the matrix material itself may prove to be too abrasive in certain applications. To overcome this, the shell may be enclosed in a thin sleeve 35 of material more closely matched in hardness to the material of the socket into which the component is to be inserted.

I claim:

1. A method of making an optical component comprising the steps of:

inserting an optical device disposed on an associated device carrier into a mould, filling the mould with curable material, optically aligning the device and its carrier with respect to the mould and, on achieving alignment, at least partially curing the material, and removing the device carrier now permanently disposed within said at least partially cured material from said mould.

2. A method of making an optical component which comprises the steps of:

inserting an optical component mounted on a support structure into a mould, filling the mould with curable material, optically aligning the optical component *and its support structure* with respect to the mould, curing the material to form an alignment shell about the [device carrier] *optical component and its support structure*, and removing the [device carrier] *optical component and its support structure* now permanently disposed within said material from said mould.

3. A method as in claim 1 wherein said material is a radiation curable material.

4. A method as in claim 3, wherein the material is curable by irradiation with UV radiation.

5. A method as in claim 1, further, comprising curing of said material at elevated temperature.

6. An optical component comprising:

a support structure and an optical component mounted thereon, and an alignment shell premanently disposed about the support structure and optical component, said shell being formed of cured material, said cured material presenting a free outer surface for mating engagement with an optical connector, *and said support structure and optical component being aligned with a portion of said outer surface of the alignment shell.*

7. A component as in claim 6, wherein the optical component is an opto-electronic component capable of converting light into an electric signal.

8. A component as in claim 6, wherein the optical component is an opto-electronic component capable of converting an electric signal into light.

* * * * *